United States Patent [19]

Clark et al.

[11] 4,136,018
[45] Jan. 23, 1979

[54] VORTEX SEPARATOR WITH COAXIAL INLET AND LIGHTWEIGHT REJECT PIPELINES

[75] Inventors: Llewellyn E. Clark; John B. Matthew, both of Pittsfield; Bruce E. Nunn, Chester, all of Mass.

[73] Assignee: Beloit Corporation, Beloit, Wis.

[21] Appl. No.: 850,366

[22] Filed: Nov. 10, 1977

[51] Int. Cl.² .............................................. B03B 5/32
[52] U.S. Cl. ...................................... 209/13; 209/240; 209/273; 210/512 R
[58] Field of Search ............... 209/273, 359, 268, 144, 209/211, 13, 240, 17, 44, 3, 277, 358, 255, 493, 494, 490; 55/203; 210/512 R

[56] References Cited

U.S. PATENT DOCUMENTS

| | | | |
|---|---|---|---|
| 1,355,270 | 10/1920 | Roberts | 209/144 |
| 2,220,676 | 11/1940 | Cowles | 92/26 |
| 3,458,038 | 7/1969 | Young | 209/273 |
| 3,844,488 | 10/1974 | Neitzel | 241/43 |
| 3,859,206 | 1/1975 | Baggaley | 209/17 |
| 3,912,622 | 10/1975 | Bolton et al. | 209/273 |
| 4,017,033 | 4/1977 | Trä | 241/28 |

*Primary Examiner*—Robert Halper
*Assistant Examiner*—Jon E. Hokanson
*Attorney, Agent, or Firm*—Dirk J. Veneman; Michael L. Gill; Gerald A. Mathews

[57] ABSTRACT

Method and apparatus for pulping and grading waste material in which the waste material is introduced into a cylindrical chamber having two end walls with a perforate screen in one of the end walls. An impeller in the chamber adjacent the perforate screen provides for pulping and pumping of the stock as well as provides rotational movement of the stock within the chamber. Lightweight rejects are continuously removed through an outlet centrally located in the end wall opposite the screen and heavy rejects are removed through an outlet in the cylindrical wall adjacent the end wall opposite the screen. The stock is introduced to the chamber through an annular inlet which surrounds and is coaxial with respect to the lightweight rejects outlet line.

12 Claims, 2 Drawing Figures

VORTEX SEPARATOR WITH COAXIAL INLET AND LIGHTWEIGHT REJECT PIPELINES

The foregoing abstract is not to be taken as limiting the invention of this application, and in order to understand the full nature and extent of the technical disclosure of this application, reference must be made to the accompanying drawings and the following detailed description.

BACKGROUND OF THE INVENTION

This invention relates to the pulping and grading of waste material and more particularly to the pulping and grading of waste stock intended for use in paper or board making machines.

In one known type apparatus for pulping and grading waste material, the stock to be so pulped and graded is introduced into a generally cylindrical chamber through a tangential inlet in the radially outer periphery. An impeller provides for pulping and rotational movement of the stock within the chamber. Accepts pass through a screen in a wall behind the impeller while heavy rejects are removed from an outlet in the periphery of the chamber. Lightweight rejects are tapped or bled off the chamber from a location at the core or axial center of the chamber.

One such apparatus of this type is disclosed in U.S. Pat. No. 2,220,676. In this apparatus, there are two impellers located at opposite ends of the chamber and two perforate screens disposed, one each behind the respective impellers. A similar type unit but utilizing only one impeller at one end of the chamber is disclosed in U.S. Pat. No. 3,844,488.

The rotational movement of the stock within the chamber of a pulper grader of this type causes large centrifugal forces which result in a significant increase in the pressure near the outer periphery or cylindrical wall. As a result of the inlet line being located at the outer periphery of the chamber, a significantly large pressure head is required to force the stock into the chamber for processing.

In our patent application, U.S. Ser. No. 756,357, filed Jan. 3, 1977, now abandoned, we disclosed a concept in which the material to be pulped or graded was introduced at the axial center or core of the chamber opposite the impeller and the lightweight rejects were bled off or tapped off the chamber from an area in the peripheral wall adjacent the end wall containing the impeller. That application disclosed that such pulper separators acted somewhat in the nature of a low power, heavy duty, defibering screen rather than a vortex separator. As a result of this, it was advantageous to bleed the lightweight rejects off the chamber through the peripheral wall in an area adjacent the wall containing the perforate screen. This was an advantageous point to remove lightweight rejects since the stock had just recently passed over the screen and accepts had been removed, thus resulting in a high concentration of lightweight rejects at that point.

Extremely low specific gravity impurities, such as styrofoam or the like having a specific gravity of about 0.15 or less, do tend to migrate to and concentrate at the central core of the chamber. These extremely lightweight rejects, therefore, sometimes are not as efficiently removed from the pulper grader disclosed in our prior U.S. application, Ser. No. 756,357 filed Jan. 3, 1977. There is a need, therefore, to provide a pulper grader with low inlet pressure requirements which is also capable of more efficiently removing extremely lightweight impurities.

SUMMARY OF THE INVENTION

According to the present invention, lightweight rejects are removed from the chamber in the area of the centrifugal core or vortex in a manner similar to that disclosed in U.S. Pat. Nos. 2,220,676 and 3,844,488 discussed above. However, in order to avoid the high pressure required at the inlet line, the stock is introduced to the chamber through an annular inlet which surrounds the lightweight rejects outlet. A cone or spreader having means to impart a rotational movement to the stock as it enters the chamber is provided coaxially about the lightweight rejects outlet.

It is an object, therefore, of the present invention to provide a pulping and grading system with reduced power requirements which is capable of efficiently removing extremely lightweight rejects.

The invention accordingly consists in the features of construction, combination of elements and arrangement of parts which will be exemplified in the construction hereinafter set forth and the scope of the application which will be indicated in the appended claims.

DESCRIPTION OF THE PREFERRED EMBODIMENT

Figure 1:
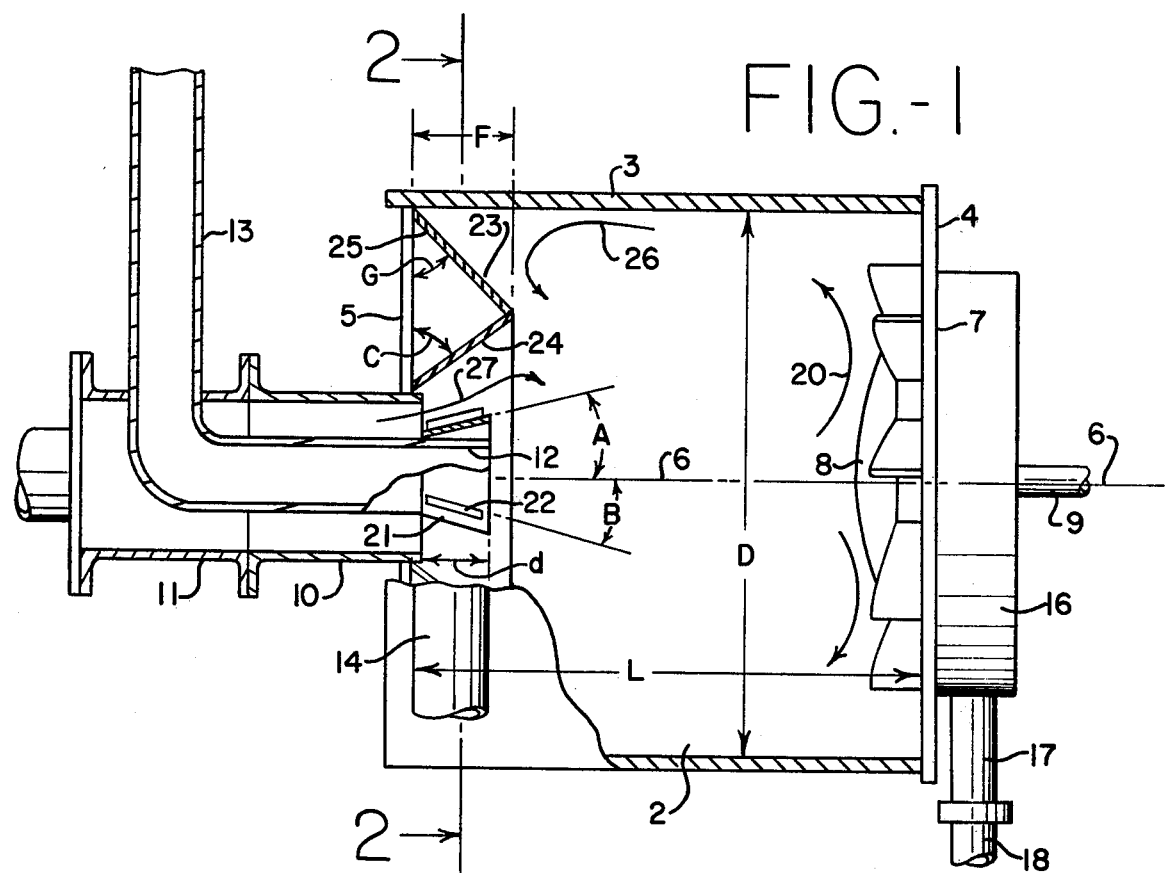
FIG. 1 is a side view of an apparatus constructed in accordance with the present invention with portions broken away.

With reference to the drawings, there is illustrated in apparatus 1 for pulping and grading waste material, particularly the pulping and grading of waste paper. The apparatus 1 includes a generally cylindrical chamber 2 defined by a substantially cylindrical wall 3, a first end wall 4 and a second end wall 5. In the particular embodiment illustrated, the inside diameter D of the chamber is 29 inches and its axial inside length L is 30 inches. While the chamber illustrated is truly cylindrical with flat end walls, it will be appreciated that the chamber need not be perfectly cylindrical nor need the end walls be perfectly flat. The end walls 4 and 5, for example, may merge with the cylindrical wall 3 through a small curve. Also, for purposes of describing the location and orientation of the various parts, an axis 6 extending perpendicularly through the center of both end walls and through the center of the cylindrical chamber will be referred to hereinafter as the central axis 6.

A generally circular perforate area 7 is located centrally in the first end wall 4. This perforate area provides a screening arrangement for permitting accepts to pass through the end wall 4 and may have holes or perforations of whatever size and shape as is desired for most efficient screening of the particular type of stock being used taking into consideration the specific quality and grade of accepts required. An impeller 8 is disposed within the chamber in a known manner adjacent the perforate area 7 with its rotational axis coincident with the central axis 6 of the apparatus 1. A shaft 9, which is connected to a source of rotational power, (not illustrated) extends through the end wall 4 and is operably connected to the impeller 8 to impart rotational motion thereto.

A heavy rejects outlet 14 is disposed in the cylindrical wall 3 near the second end wall 5. In the specific embodiment illustrated, the heavy rejects outlet is disposed next adjacent the first wall 5.

Figure 2:
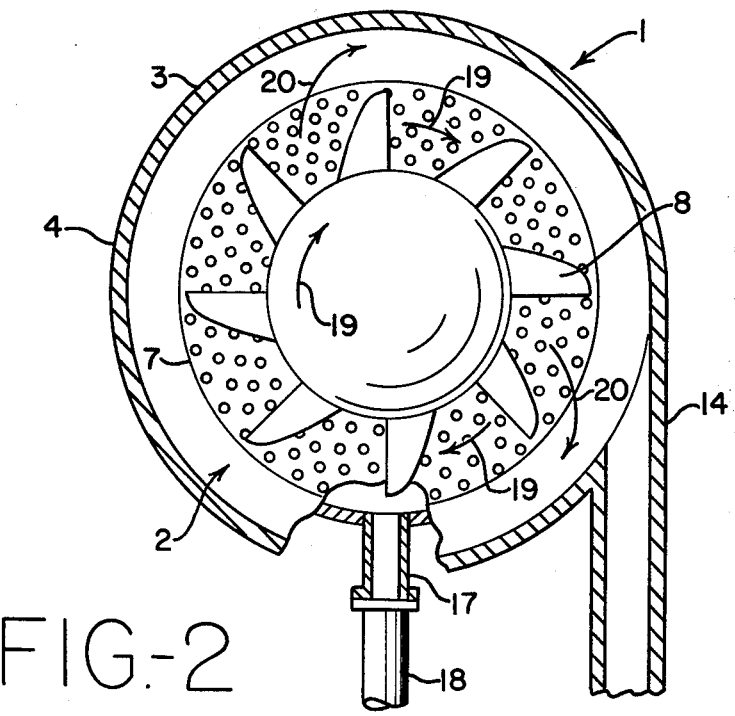
FIG. 2 is a sectional view of the apparatus of FIG. 1 taken substantially along line 2—2 of FIG. 1 with portions broken away.

The heavy rejects outlet, therefore, is located at the point of last migration of heavy rejects along the cylindrical wall 3 thus avoiding the buildup of such rejects adjacent the second wall 5 which can continue to whirl around the chamber causing excessive wear. Also, as best seen in FIG. 2, the heavy rejects outlet extends in a direction tangent to the cylindrical wall 3 and in the general direction of rotation of the impeller 8. Although not illustrated herein and forming no part of the invention, the heavy rejects line would normally be equipped with a junk trap arrangement which provide for intermittent dumping of the heavy rejects.

In accordance with the present invention, a lightweight rejects nozzle 12 extends through the end wall 5 in a position such that its long axis is coincident with the central axis 6. In the particular embodiment illustrated, the rejects nozzle 12 is a 4 inch inside diameter pipe and extends a distance d approximately 5 inches inwardly of the tank beyond the end wall 5. The nozzle 12, therefore, extends inwardly of the second end wall a distance equal to about 16% of the axial length of the chamber. It is recommended that this distance be kept between 10 and 25% of the length of the chamber. In the particular embodiment illustrated, the light rejects nozzle 12 is connected to a pipe 13 which extends at right angles with respect to the central axis 6. The pipe 13 is provided with a valve (not shown) for providing intermittent or adjustment of the flow of lightweight rejects from the tank.

Also in accordance with the present invention, a supply line or inlet pipe 10 surrounds and is coaxially disposed with respect to the lightweight rejects pipe 12. A special transition illustrated at 11 permits the pipe 13 to immerge from the surrounding inlet pipe 10. In the particular embodiment illustrated, the inlet pipe 10 is a 10 inch inside diameter pipe. It thus can be seen that the material to be pulped and graded enters the pulping and grading apparatus 1 through an annular opening which surrounds the lightweight rejects nozzle 12.

An accepts chamber 16 is connected to the first end wall 4 and encloses the area outside the chamber 2 adjacent to perforate area 7 for receiving accepts passing through the perforate area or screen 7. An exit 17 is connected to the accepts chamber 16 and is in communication with an accepts pipeline 18. Particularly, with reference to FIG. 2 in the particular embodiment illustrated, the rotation of the impeller is indicated by the arrow 19 which imparts a pumping and whirling motion to the slurry or stock within the chamber generally in the direction of the arrows 20. The stock, therefore, moves along the central axis 6 toward the impeller 8, proceeds radially outwardly in the area of the impeller 8 to the cylindrical wall 3 and then back generally along the cylindrical wall 3 toward the second end wall 5 returning again to the central axis 6. In addition, the stock is continually whirling about in the chamber in the directions generally illustrated by the arrows 19 and 20 in FIG. 2. This whirling and pumping action of the stock within the chamber provides a pulping and separating action.

In order to avoid undue disturbance of this motion of the stock within the chamber, a diffuser 21 in the general configuration of truncated cone is disposed coaxially about the nozzle 12 and extends generally in directions parallel to the central axis 6 from the plane of the second end wall 5 inwardly with respect to the chamber to the terminous of the lightweight rejects nozzle 12. In the particular embodiment illustrated, this distance is 5 inches. The conical surface in the particular embodiment illustrated forms an angle A with respect to central axis 6 of approximately 15 degrees.

Bars or vanes 22 are rigidly affixed to the radially outer surface of the cone structure 21 in a general spiral fashion. The spiral pattern is arranged in the same angular direction as the angle of rotation of the impeller 8 and in the particular embodiment illustrated is disposed at an angle B with respect to a projection of the central axis 6 on the cone of approximately 15 degrees. These bars 22 thus arranged on the outer surface of the cone 21 impart a generally rotating or whirling motion to the stock as it enters the chamber to thus avoid disruption of the centrifugal action of the stock with the chamber.

Further in order to avoid disruption of the flow pattern within the chamber, a baffle arrangement 23 in the form of a pair of truncated cones 24 and 25 is provided on the second wall 5 and coaxially arranged about the inlet pipe 10. The truncated cones 24 and 25 and the second end wall 5 thus form a toroid having a cross section in the shape of a triangle. In the particular embodiment illustrated, the baffle 23 extends a distance F of 6 inches into the chamber from the second end wall 5 and the truncated cones 24 and 25 extend at angles C and G with respect to the first end wall 5 of approximately 54 degrees. The baffle arrangement 23, therefore extends outwardly from the second end wall 5 a distance slightly greater than the rejects line 12 and the diffuser 21.

Although in the specific embodiment illustrated, the length of the tank was slightly greater than its diameter, it will be appreciated that the relative dimensions can vary so long as the tank is sized such that the impeller, located at one end only, wil impart the whirling pumping motion described.

In the operation of the machine, the impeller 8 imparts a whirling pumping motion to the stock in the tank and causes the material to move from the first wall 4 along the peripheral wall 3 toward the second wall 5. The conical baffle 25 directs the flow radially inwardly and axially somewhat back toward the impeller as indicated by the arrow 26. Incoming stock joins the flow of stock already within the chamber somewhat along the lines of arrow 27 without causing excessive disturbance of the general flow within the tank. Lightweight rejects accummulate along the axis 6 and are let off through the light rejects line 12.

While specific representative embodiment and details have been shown for the purpose of illustrating the invention, it will be apparent to those skilled in the art that various changes and modifications may be made therein without departing from the spirit or scope of the invention.

What is claimed is:

1. An apparatus for pulping and grading material, particularly for the pulping and grading of waste paper, said apparatus comprising:
   a cylindrical chamber having a first end wall, a second end wall, a cylindrical wall connecting said first and second end walls and a central axis extending through said chamber and both end walls thereof;
   an annular perforate area disposed in said first end wall;

an impeller in said chamber adjacent said perforate area and being mounted for rotation about an axis coincident with said central axis;

an outlet for lightweight rejects disposed in said second wall at said central axis;

a generally annular inlet opening in said second end wall surrounding the lightweight rejects outlet;

an outlet for heavy rejects in said cylindrical wall; and, means providing a takeoff chamber to receive a stream of stock passing through said annular perforate area.

2. An apparatus as claimed in claim 1 wherein a diffuser in the form of a truncated cone is disposed coaxially about said outlet for lightweight rejects for diffusing incoming material radially outwardly as said material enters said chamber.

3. An apparatus as claimed in claim 2 including vanes disposed on the radially outer surface of said diffuser and angularly arranged with respect to said central axis to provide rotational movement of said material in the direction of rotation of said impeller when said material enters the chamber.

4. An apparatus as claimed in claim 2 wherein said outlet for lightweight rejects includes a nozzle extending inwardly of said second wall a distance equal to between ten and twenty-five percent of the axial length of said chamber.

5. An apparatus as claimed in claim 3 wherein said outlet for lightweight rejects includes a nozzle extending inwardly of said second wall a distance equal to between ten and twenty-five percent of the axial length of said chamber.

6. An apparatus as claimed in claim 4 including a baffle in the form of a toroid surrounding said inlet, said toroid having a cross-sectional configuration generally in the shape of a triangle with one side being defined by said second wall.

7. An apparatus as claimed in claim 5 including a baffle in the form of a toroid surrounding said inlet, said toroid having a cross-sectional configuration generally in the shape of a triangle with one side being defined by said second wall.

8. An apparatus as claimed in claim 6 wherein said baffle extends outwardly from said second end wall a distance at least as great as the length of said nozzle.

9. An apparatus as claimed in claim 7 wherein said baffle extends outwardly from said second end wall a distance at least as great as the length of said nozzle.

10. A method of pulping and grading material for use in making paper or the like in a separator unit of the type having an elongated chamber defined by a cylindrical wall, a first end wall having a perforate screen and a second wall opposite said first end wall and further including one impeller only in said chamber adjacent said first wall to provide rotational movement of said material concurrently with the movement of said material radially outwardly in the area of said impeller and back toward said first wall, the improvement comprising:

removing lightweight rejects through an outlet in the center of said second end wall, removing heavy rejects through an outlet in said cylindrical wall, passing accepts through the perforate screen and introducing said material into said chamber through an area surrounding and immediately adjacent to the opening for removing lightweight impurities.

11. A method as claimed in claim 10 including diffusing said material radially outwardly with respect to a central axis of said chamber upon entry of said material into said chamber.

12. A method as claimed in claim 11 further including imparting rotational movement through said material in the general direction of the rotation of said impeller prior to the entry of said material into said chamber.

* * * * *